(12) United States Patent
Lisch

(10) Patent No.: US 11,390,012 B2
(45) Date of Patent: Jul. 19, 2022

(54) SEAL FOR A CONTAINER AND METHOD OF INSTALLING PRIOR TO CONTAINER EJECTION

(71) Applicants: DISCMA AG, Zürich (CH); G. David Lisch, Jackson, MI (US)

(72) Inventor: G. David Lisch, Jackson, MI (US)

(73) Assignee: Discma AG, Zürich (CH)

( * ) Notice: Subject to any disclaimer, the term of this patent is extended or adjusted under 35 U.S.C. 154(b) by 109 days.

(21) Appl. No.: 15/773,094

(22) PCT Filed: Mar. 8, 2016

(86) PCT No.: PCT/US2016/021357
§ 371 (c)(1),
(2) Date: May 2, 2018

(87) PCT Pub. No.: WO2017/078773
PCT Pub. Date: May 11, 2017

(65) Prior Publication Data
US 2018/0319071 A1      Nov. 8, 2018

Related U.S. Application Data

(60) Provisional application No. 62/250,370, filed on Nov. 3, 2015.

(51) Int. Cl.
*B29C 49/46* (2006.01)
*B29C 49/42* (2006.01)
(Continued)

(52) U.S. Cl.
CPC .............. *B29C 49/46* (2013.01); *B29C 49/12* (2013.01); *B29C 49/06* (2013.01);
(Continued)

(58) Field of Classification Search
CPC .... B29C 2049/4664; B29C 2049/4294; B29C 49/46; B29C 49/06; B67B 1/10; B67B 1/04; B67B 3/22; B65B 7/2821; B65B 7/2807
See application file for complete search history.

(56) References Cited

U.S. PATENT DOCUMENTS 4,098,053 A   *   7/1978   Shank ................... B65B 7/2821
                                                        53/319
2013/0106028 A1     5/2013   Lisch et al.
(Continued)

FOREIGN PATENT DOCUMENTS

EP          2860016 A1       4/2015
JP         57123027 A    *   7/1982   ............. B29C 49/46
WO       2013/117492 A1      8/2013

OTHER PUBLICATIONS

Translation of Japanese Patent Application Publication No. 57-123027 ("Saito") (Year: 1982).*

*Primary Examiner* — Niki Bakhtiari
*Assistant Examiner* — John J DeRusso
(74) *Attorney, Agent, or Firm* — Eric J. Sosenko; Jonathan P. O'Brien; Honigman LLP

(57) ABSTRACT

A hydraulic blow molding apparatus having a container forming station with a forming head coupled to a source of liquid blow medium. The container forming station further includes a mold configured to receive a preform and has interior surfaces that define the container shape. The container forming station injects a liquid end product into the preform and expands the preform to simultaneously form and fill a container with the liquid end product. Prior to the container being removed from the container forming station and while it is still full of the liquid end product, a seal is engaged with the container.

15 Claims, 6 Drawing Sheets

(51) Int. Cl.
*B29C 49/12* (2006.01)
*B29C 49/06* (2006.01)
*B29C 49/02* (2006.01)

(52) U.S. Cl.
CPC ............... *B29C 2049/023* (2013.01); *B29C 2049/4294* (2013.01); *B29C 2049/465* (2013.01); *B29C 2049/4664* (2013.01)

(56) References Cited

U.S. PATENT DOCUMENTS

| | | |
|---|---|---|
| 2013/0161878 A1 | 6/2013 | Maki et al. |
| 2014/0174044 A1 | 6/2014 | Chauvin et al. |
| 2016/0052190 A1* | 2/2016 | Frankenberger ...... B65B 7/2821 156/500 |

* cited by examiner

SEAL FOR A CONTAINER AND METHOD OF INSTALLING PRIOR TO CONTAINER EJECTION

FIELD OF THE INVENTION

The present invention generally relates to the molding and filling of plastic containers while using the liquid end product as molding medium. More specifically, the invention relates to sealing the liquid end product in the container prior to ejection of the container from the forming station of the hydraulic blow molding machine.

BACKGROUND

Plastic containers for liquid products are manufactured by various different methods. In some methods, a plastic preform is injection molded in a preform molding machine and subsequently cooled to ambient temperatures. A second machine, which may be in a remote location relative to the first machine, re-heats the preform to a suitable temperature for molding, places the thermally conditioned preform within a mold and then expands the preform, both axially and radially, to form a container. Such a process is known as a two-step molding process, and a corresponding system is known as a two-step system.

In another process, the injection molding of the preform and the subsequent forming of the container all occur, in the same machine or in different machines, without allowing the preform to significantly cool and require reheating. Such processes, machines and systems are correspondingly known as one-step technologies.

In either of the above, air has traditionally been used as the blow medium to axially and radially expand the preform and form the container. Instead of using air as the blow medium, a more recent process use the liquid end product, the product intended to be retained and distributed in the container, as the blow medium. The processes, apparatuses and systems that form and fill a container using the liquid end product as the blow medium are generally known as liquid or hydraulic blow molding technologies. Hydraulic blow molding can also be practiced via either a two-step or one-step molding scheme.

As used herein, the term "liquid" is intended to encompass non-gas, flowable mediums. The liquid may therefore have a low viscosity (like water or alcohol), a medium viscosity (like edible oil or soup) or a high viscosity (like catsup or yogurt). Also the liquid may be homogeneous or nonhomogeneous and is not intended to be limited to foodstuff. Non-limiting illustrative examples of liquids that may be utilized with the present invention include cleansing products (for body, house or automotive care), medical fluids, industrial fluids, automotive fluids, and agricultural fluids.

In a typical hydraulic blow molding machine, at the container forming station, a forming head is provided with an injection nozzle, a seal pin and a stretch rod. The injection nozzle is axially movable along the central axis, by an actuator, between engaged and disengaged positions where the injection nozzle seals with either the preform, surfaces of the mold securing the preform or surfaces of a neck ring that secures the preform to the mold.

Defined through the interior of the injection nozzle is a central passageway. This central passageway is in communication with a source of the liquid blow medium. When provided to the central passageway, the liquid blow medium is pressurized, preferably by one of the well-known devices used for providing pressurized fluids during the molding and filling of containers. These devices include several motors, pressure pumps, pistons and other appropriate devices.

Located within the central passageway is a seal pin that is axially movable between extended and retracted positions along the central axis. This movement is effectuated by an actuator, which may be of any well-known variety of actuator utilized in connection with the hydraulic blow molding of plastic containers. Such actuators are often pneumatically driven, but may be driven by other means, including without limitation, electric motors, servomotors, magnetic or other means. The distal end of the seal pin typically includes a head having surfaces defining a sealing ring that engages a sealing seat provided on a sealing bell, the latter of which may be considered as part of the injection nozzle and which is located adjacent to and/or defines the exit orifice of the injection nozzle.

Extending through a longitudinal bore in the seal pin is a stretch rod or member. The stretch rod is extendable by an actuator (similar to the previously mentioned actuators) out of the seal pin, through the exit orifice and into the body of the preform. When fully extended, the stretch rod engages a closed end of the preform and axially stretches the preform to assist in forming the container.

Typically, once a mold has closed about the body of the preform, with the body of the preform being located within a mold cavity defining the shape of the desired container, the forming head and/or injection nozzle is lowered by the actuator to create the sealed engagement with the preform. At this time, the seal pin is in an extended position and is sealingly engaged with the injection nozzle. Next, the stretch rod is extended to engage the closed-end of the preform and the seal pin is retracted to open the exit orifice and allow the liquid blow medium to be injected into the preform. Simultaneously with or in advance of the opening of the exit orifice, the stretch rod may be further and fully extended to impinge the closed-end of the preform between the distal end of the stretch rod and the bottom of the mold cavity. The continued injection of liquid blow medium causes the axially stretched preform to radially expand into conformity with the surfaces of the mold cavity, thereby simultaneously forming and filling the container. Once the container is formed and filled, the stretch rod is retracted and the seal pin extended, the latter closing the injection nozzle and thereby stopping the introduction of the liquid into the container. After the forming head and injection nozzle are retracted, the mold may be opened and the formed and filled container removed from the forming station.

As seen from the above, when being removed from the forming station, the filled container is not capped and sealed. This can therefore lead to some of the liquid product contained therein being spilled as the container is ejected from the forming station and transferred to a capping station.

SUMMARY

In one aspect, the present invention provides a hydraulic blow molding apparatus having a container forming station with a forming head coupled to a source of liquid blow medium. The container forming station further includes a mold having interior surfaces defining a container shape and configured to receive a preform therein. The container forming station is configured to inject a liquid end product as the liquid blow medium into the preform and expand the preform into contact with the interior surfaces of the mold, simultaneously forming and filling the container with the liquid end product. While the container is located within the container forming station and full of the liquid end product, a seal is engaged with the container.

In another aspect, the seal is an inner liner/seal.

In a further aspect, the seal extends completely or partially across a top sealing surface of the container.

In yet another aspect, the seal includes an axially extending ring in press-fit or frictional engagement with an inner surface the container.

In an additional aspect, the seal includes a disc closing a mouth defined by the finish of the container.

In still a further aspect, the seal includes a radial flange extending completely across the top sealing surface of the finish of the container.

In another aspect, the seal defines a diameter $D_{s2}$ that is substantially equal to an outer diameter $D_f$ of the finish of the container.

In a further aspect, the container includes a parting line located on an exterior surface of the finish of the container.

An additional aspect, the seal includes a radial flange extending less than completely across the top sealing surface of the finish of the container.

In yet another aspect, the seal defines a diameter $D_s$ that is less than an outer diameter $D_f$ of the finish of the container.

In still another aspect, the container includes a parting line located on the top sealing surface of the container, the parting line preferably having a diameter $D_p$ that is greater than the diameter $D_s$ of seal.

In yet an additional aspect, the hydraulic blow molding apparatus includes a sealing mechanism configured to apply the seal to container prior to removal of the container from the forming station, the sealing mechanism including a plug that is movable in a direction towards the finish of the container, the plug having an end configured to receive and retain the seal sea.

In a further aspect, the plug is coupled to an air source configured to apply a vacuum retaining the seal in engagement with the plug.

In still a further aspect, the air source is configured to provide pressurized air causing the seal to be released from the plug.

In another aspect, the plug is biased in the direction of the container.

In a further aspect, the hydraulic blow molding apparatus is a one-step hydraulic blow molding apparatus.

Another aspect of the invention provides a method for hydraulically blow molding a container from a preform using a liquid end product as a liquid blow medium, the method comprising the steps of, in a forming station, hydraulically blow molding a formed and filled container from a preform using a liquid blow medium; engaging a seal with the finish of container while the container is retained within a mold in the forming station; and removing the container having the seal engaged therewith from the forming station.

In an additional aspect, the method is performed in a one-step hydraulic blow molding apparatus.

In a further aspect, the step of engaging the seal with the finish of the container includes engaging the seal in a press-fit engagement with an inner surface of the finish.

In another aspect, the step of engaging the seal with the finish of the container includes engaging a radial flange of the seal with a top sealing surface of the container.

In still another aspect, a parting line is defined the top sealing surface and the radial flange engages less the top sealing surface radially inward of the radial flange.

In yet a further aspect, a parting line is defined on an exterior surface of the finish and the radial flange engages all of the top sealing surface.

DETAILED DESCRIPTION

The present invention is applicable to containers formed and filled in a hydraulic blow molding process of either a one-step or two-step variety. As noted above, a hydraulic blow molding process is one by which a plastic container is simultaneously formed and filled utilizing the liquid end product as the blow medium. As a result of the liquid blow medium, the hydraulic blow molding process has many issues and challenges that are not appreciated by traditional blow molding technologies utilizing air as the blow medium.

One such issue and challenge involves the removal of the formed and filled container from the mold assembly. Since the container is already filled with the liquid end product, forces created when removing the filled container at high speed can result in some liquid end product being spilled from the container. This spillage has the potential to contaminate various surfaces and components of the machine, which in turn may lead to subsequently produced containers being inadequately formed. To prevent such spillage, the present invention provides a system and method by which a liner seal is engaged with the finish of the formed and filled container prior to removal from the mold assembly of the hydraulic blow molding apparatus.

As used herein, the term "liquid" is intended to encompass non-gas, flowable mediums. The liquid may therefore have a low viscosity (like water or alcohol), a medium viscosity (like edible oil or soup) or a high viscosity (like catsup or yogurt). Also the liquid may be homogeneous or nonhomogeneous and is not intended to be limited to foodstuff. Non-limiting illustrative examples of liquids that may be utilized with the present invention include cleansing products (for body, house or automotive care), medical fluids, industrial fluids, automotive fluids, and agricultural fluids.

Two embodiments incorporating the principles of the present invention are presented herein. These embodiments depend on the manner in which the preform is initially formed and the resultant structure of the preform. The first embodiment is presented in connection with FIGS. 1-6 and the second embodiment is presented in connection with FIGS. 7-12.

Figure 2:
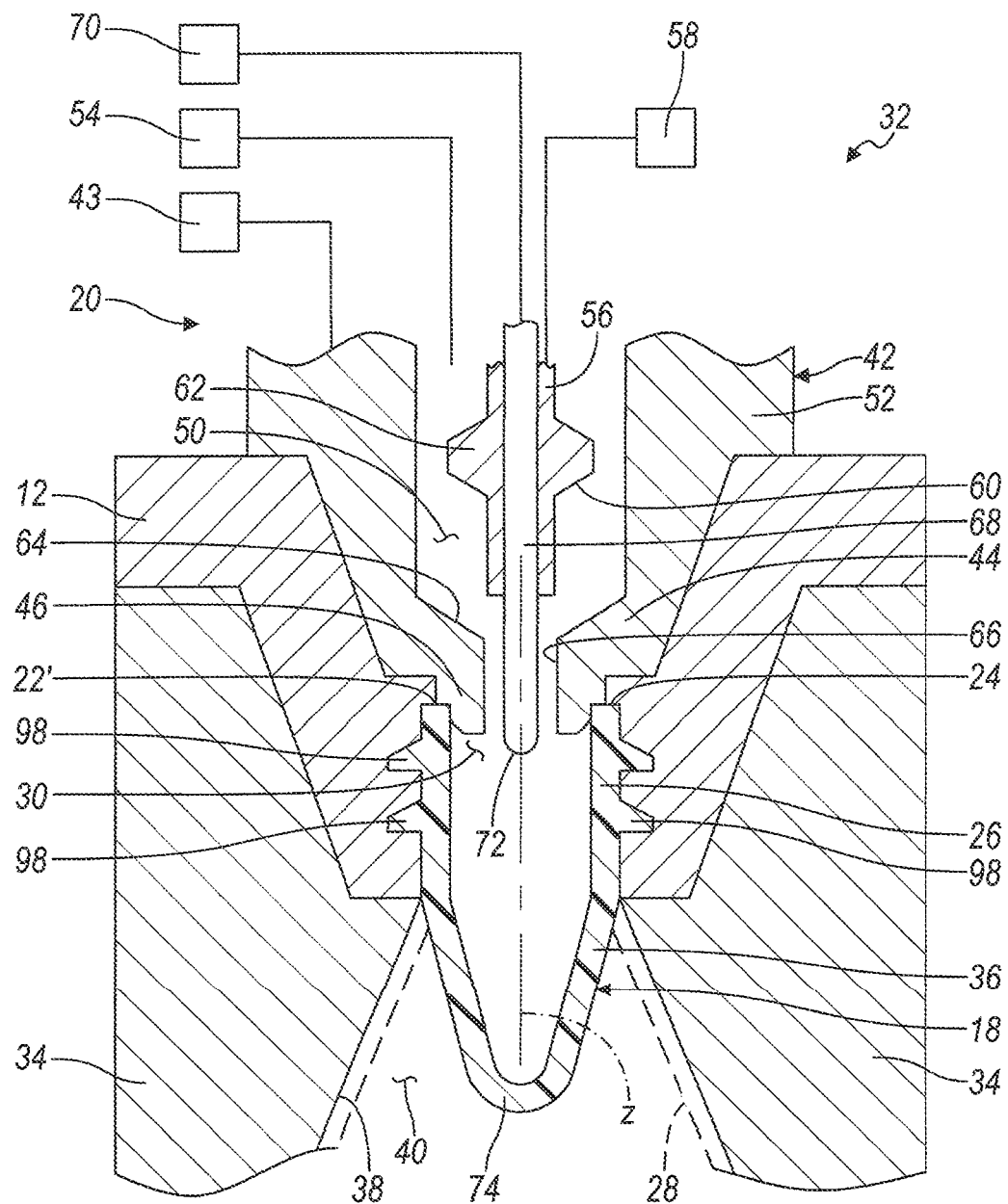
FIG. 2 is a cross-sectional view illustrating a portion of a container forming station in which the preform molded in FIG. 1 is formed into a container by injecting a liquid blow medium into the preform.
Figure 3:
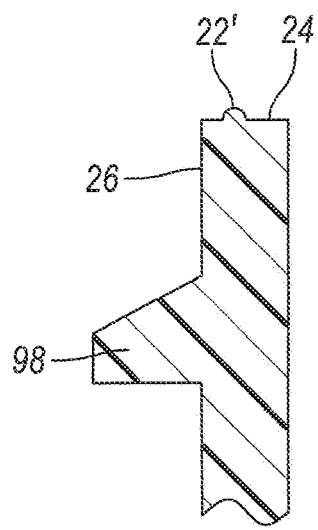
FIG. 3 is an enlarged view of part of the finish of the container formed in FIG. 2 and shows the parting line being located on the top sealing surface of the finish.
Figure 4:
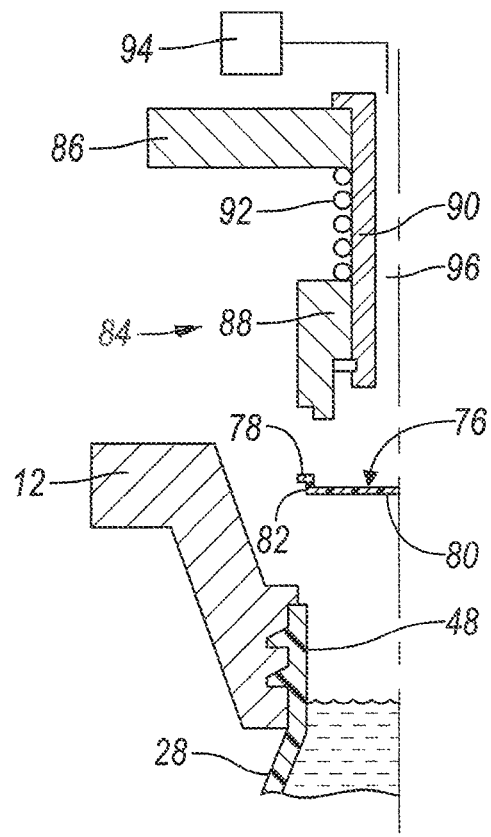
FIG. 4 is a schematic illustration of a mechanism for placing a liner seal in engagement with a formed and filled container prior to ejection of the container from the mold.
Figure 6:
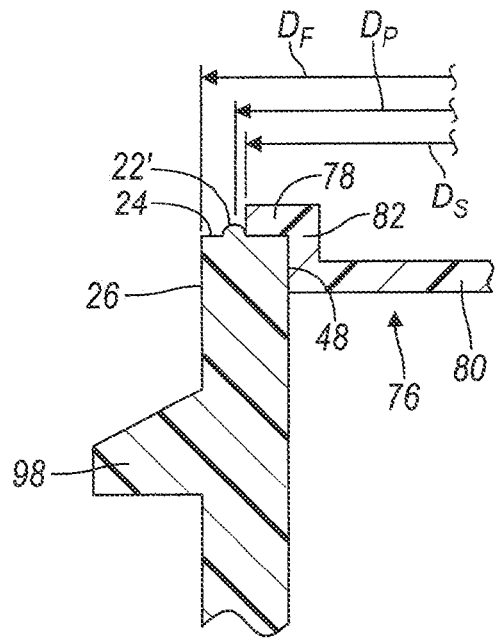
FIG. 6 is an enlarged partial view of the finish of the filled container and shows the liner seal mounted to the finish.
Figure 5:
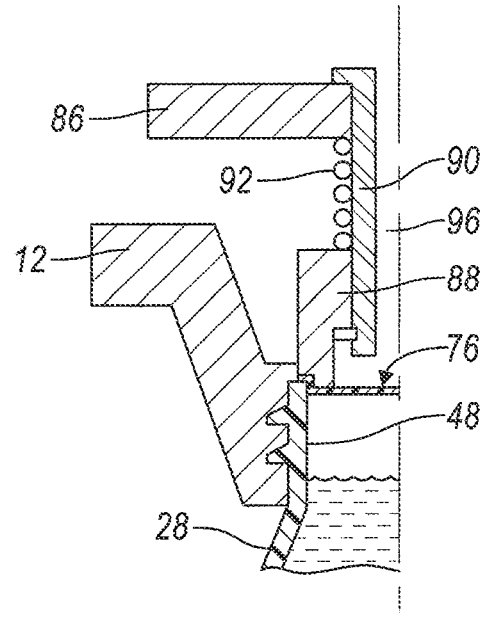
FIG. 5 is a schematic illustration of an mechanism for placing an liner seal in engagement with a formed and filled container prior to ejection of the container from the mold.

At an injection molding station 10, thread splits 12 are engaged between a preform core 14 and a preform cavity mold 16 prior to the injection molding of the preform 18, which is seen FIG. 2, and cooperate to define a molding cavity 19 in the desired shape of the preform 18. Molten plastic resin, such as polyethylene terephthalate (PET), is injected into the molding cavity 19 by an injection device 20 through a gate 21 formed in the preform cavity mold 16.

Figure 1:
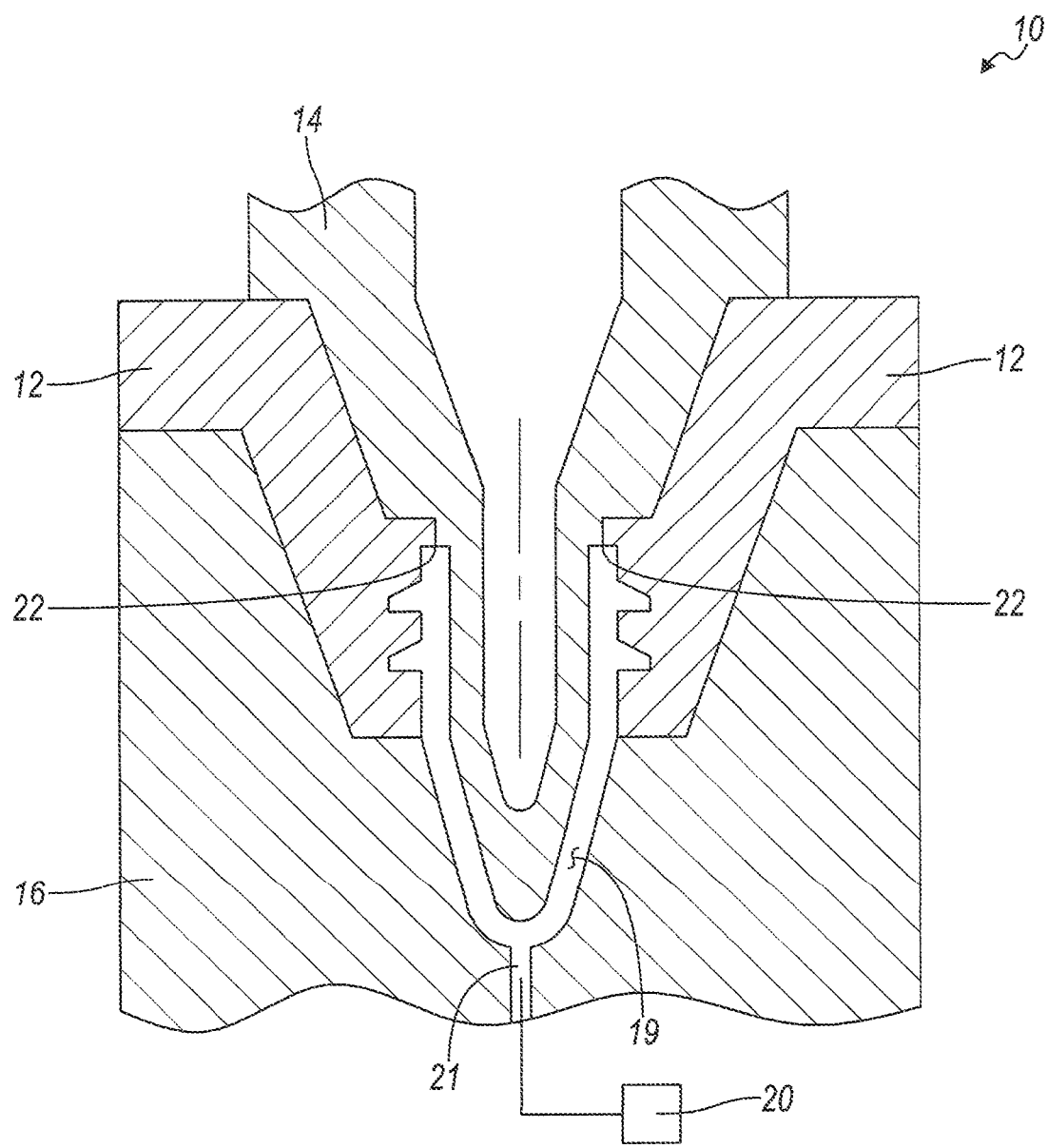
FIG. 1 is a cross-sectional view illustrating a portion of an injection molding station in which a preform for a container is molded with the parting line of the preform located on the top sealing surface of the preform.

As seen in FIG. 1, the thread splits 12 engage with the preform core 14 such that a parting line 22 between the thread splits 12 and the preform core 14 is located approximately midway in that portion of the mold cavity 19 that will form a top sealing surface (TSS) 24 of the finish 26 of a resultant container 28. The TSS 24 is the end surface of the preform 18 and generally extends around the opening or mouth 30 of the preform 18. The existence of the parting line 22 between the preform core 14 and the thread splits 12 results in an artifact, sometimes referred to as flash or also as a parting line (and herein designated as parting line 22'), being formed on the preform 18 and the container 28. The above features are readily seen in FIG. 3. If the parting line 22' is on the TSS 24, it may impact the sealing of the container 28.

In a one-step process, after molding the preform 18 in the injection molding station 10, the preform 18 is transferred to a container forming station 32, which is schematically illustrated in FIG. 2. A two-step process would similarly transfer the preform 18 to a container forming station, but would not use the thread splits 12 to achieve this transfer. The forming and filling steps discussed herein, however, would generally be the same.

In the forming station 32, mold halves 34 are closed about the thread splits 12 and the body 36 of the preform 18. The mold halves include interior surfaces 38 that cooperate to define a cavity 40 in the desired shape of the resultant container 28.

With the preform 18 secured within the thread splits 12 and the mold halves 34, a forming head 42 is lowered by an actuator 43 such that a nozzle bell 44 engages portions of the thread splits 12 and sealingly engages the preform 18. In the illustrated embodiment, the nozzle bell 44 includes a collar 46 that engages with an inward half of the TSS 24 and extends into the mouth 30 of the preform 18 and along interior surfaces 48 of the finish 26.

The forming head 42 has a central passageway 50 defined within a nozzle body 52 and through which is defined a central axis Z. Coupled to the forming head 42, a source 54 of the liquid blow medium is in communication with the central passageway 50 and provided thereto at a pressure sufficient to cause the preform 18 to expand and form the container 28, as further discussed below.

Also located within the central passageway 50 is a seal pin 56. The seal pin 56 is axially movable, by a corresponding actuator 58 along a central axis Z through the central passageway 50. The seal pin 56 is movable between an extended position and a retracted position. In the extended position, a sealing surface 60 formed on a sealing boss 62 sealingly engages a correspondingly shaped sealing seat 64 formed on an interior surface of the nozzle bell 44. This sealing engagement closes off the exit orifice 66 and prevents liquid blow medium from being discharged from the forming head 42. As seen in FIG. 2, the sealing surface 60 and the sealing seat 64 are correspondingly shaped as conical, tapered surfaces.

In the retracted position of the sealing pin 56, the sealing boss 62 is retracted into the central passageway 50 and the sealing surface 60 spaced apart from the sealing seat 64 of the nozzle bell 44. As a result, the exit orifice 66 is open and the liquid blow medium is injected from the central passageway 50 into the interior of the preform 18.

Prior to the injecting of the liquid blow medium into the preform 18, a stretch rod 68 is extended by a corresponding actuator 70 until the distal end 72 of the stretch rod 68 engages a closed-end 74 of the preform 18. Either prior to or simultaneous with the injecting of the liquid blow medium, the stretch rod 68 is further advanced so as to axially stretch the preform 18. During axial stretching, the stretch rod 68 may impinge the closed-end 74 of the preform 18 against surfaces of the mold halves 34 defining the bottom of the container 28. As a result of the injection of the liquid blow medium, the body 36 of the preform 18 is also radially expanded until it contacts the interior surfaces 38 of the mold halves 34 thereby simultaneously forming and filling the container 28, which is shown in phantom in FIG. 2.

In accordance with the principles of the present invention, a seal 76, which is preferably an inner liner/seal, is engaged with the finish 26 to seal the mouth 30 of the filled container 28 prior to the removal of the container 28 from the forming station 32. Since the inner liner/seal 76 is provided on the filled container 28 prior to its removal, no spillage of the liquid product from within the container 28 will occur.

In the first embodiment, and as particularly seen in FIG. 64, the inner liner/seal 76 has a radial flange 78 that defines an outer diameter $D_s$ of the inner liner/seal 76 that is less than the outer diameter $D_f$ of the finish 26 or TSS 24 of the container 28. More specifically, the diameter $D_s$ is dimensioned so that the radial flange 78 terminates adjacent to or before, and does not extend over, the parting line 22' on the TSS 24. The inner liner/seal 76 can, therefore, also be seen as having a diameter $D_s$ that is less than the diameter $D_p$ defined by the parting line 22'.

In addition to radial flange 78, the inner liner/seal 76 includes a central disc 80, which is connected to the radial flange 78 by an axially extending ring 82. The ring 82 extends axially from the innermost end of the radial flange 78 so that, when the inner liner/seal 76 is engaged with the container 28, the ring 82 extends along and is in surface-to-surface sealing contact, a press-fit or frictional engagement, with the inner surface 48 of the finish 26 defining the mouth 30 of the container 28. The disc 80 extends across the ring 82 and closes off the inward region of the inner liner/seal 76. The disc 80 is thus located on the ring 82 opposite from the radial flange 78. The sealing engagement defined by the inner liner/seal 76 is therefore defined by both the engagement of the radial flange 78 with a portion of the TTS 24 and the engagement of the ring 82 with a portion of the inner surface 48 of the finish 26.

In order to engage the inner liner/seal 76 with the finish 26 of the filled and formed container 28, the eject rod fixing plate 86 of the forming station 32 may be modified to include a sealing mechanism 84 and carry a plug 88 whose end is correspondingly stepped or otherwise shaped to receive and hold the inner liner/seal 76. In the illustrated embodiment, the plug 88 is fixedly mounted to a hollow shaft 90 which extends through an opening of the fixing plate 86. Between the fixing plate 86 and the plug 88, generally along the exterior of the shaft 90, is a compression spring 92. The compression spring 92 biases the plug 88 in a direction away from the fixing plate 86. The placement of the inner liner/seal 76 on the plug 88 may be effectuated by a mechanical device or a robot (not shown) and retention in position on the end of the plug 88 by either an interference fit or by a vacuum 94 applied to the plug 88 either through an air channel 96 in the shaft 90 or other means.

After forming and filling of the container 28, but before removal from the forming station 32, the fixing plate 86, with the inner liner/seal 76 mounted thereon, is moved downwardly to engage the container 28. As a result, the inner liner/seal 76 is inserted into the finish 26, stopping when the radial flange 78 contacts the TSS 24 and is impinged between the plug 88 and the TSS 24. The spring 92 located between the plug 88 and the fixing plate 86 ensures that the inner liner/seal 76 is not over compressed by the downward movement of the fixing plate 86 and plug 88.

Once the inner liner/seal 76 is engaged with the finish 26, the vacuum 94 is released and the greater frictional engagement between ring 82 of the inner liner/seal 76 and the inner surfaces 48 of the finish 26 disengages the inner liner/seal 76 from the plug 88. Alternatively, application of a slight positive pressure through the air channel 96 can be provided to ensure that the inner liner/seal 76 disengages from the plug 88.

With the inner liner/seal 76 in place on the finish 26, the filled container 28 can be removed from the forming station 32 without worry that liquid product in the container will be spilled during the removal step.

From the forming station the container 28, with the inner liner/seal 76 in place, can be transferred to a capping station where cap (not shown) is attached and engaged with the exterior threads 98 of the finish 26. In this regard, it is noted that the seal 76 utilized herein is distinguishable from a cap, since the seal 76, as that term is used herein, is not in threaded engagement with the finish 26.

Referring now to FIGS. 7-12, a second embodiment incorporating the principles of the present invention is illustrated therein. The second embodiment includes numerous elements that are the same as elements discussed above in connection with FIGS. 1-6. Accordingly, like elements are identified with the same reference numerals and discussion of their function and operation is omitted in connection with FIGS. 7-12 in the interest of brevity. In that regard, reference should be made to the prior discussion of the same elements in connection with FIGS. 1-6. The discussion which follows, therefore, focuses on the differences between the second embodiment and the first embodiment.

Figure 7:
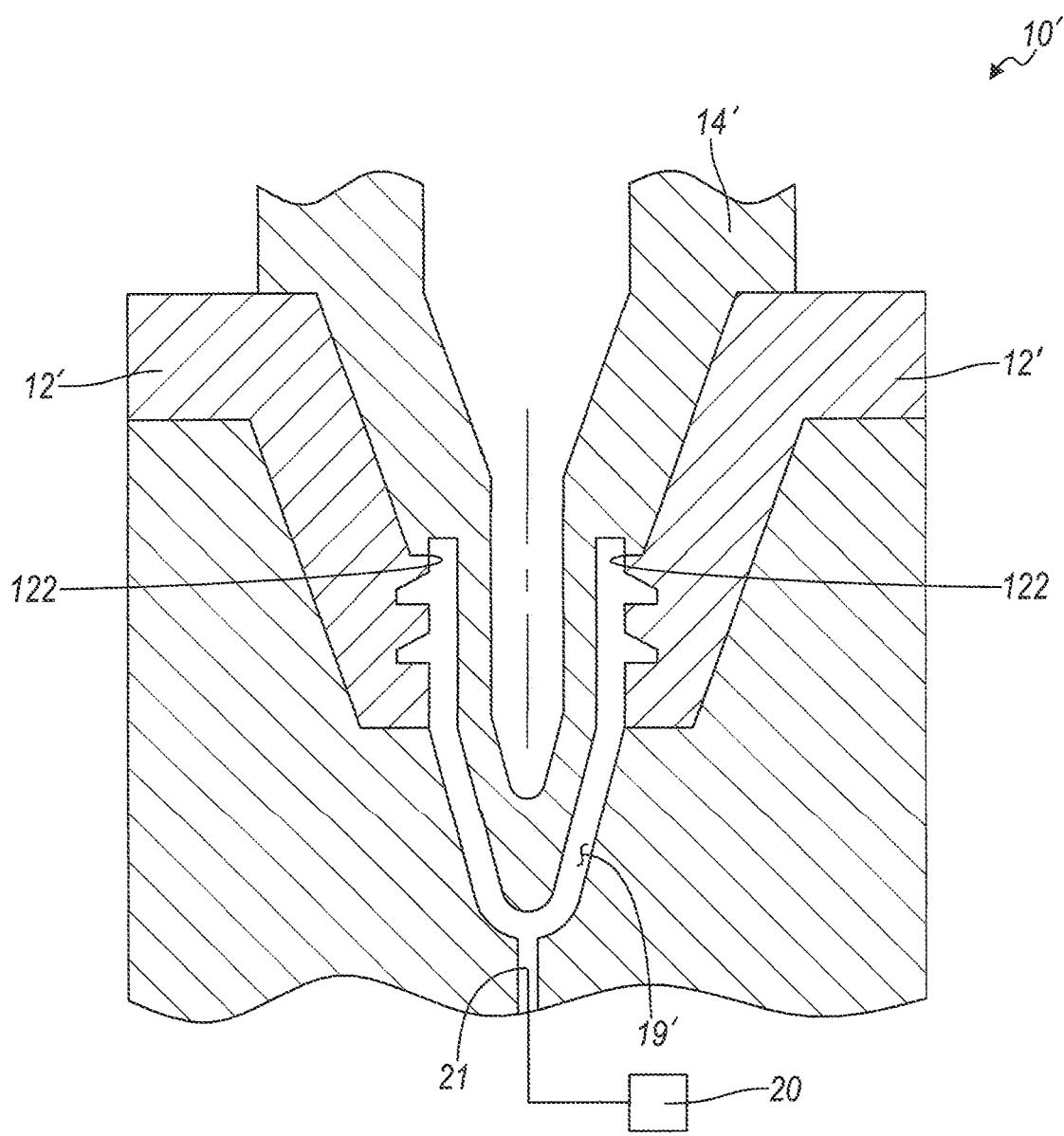
FIG. 7 is a cross-sectional view illustrating a portion of an injection molding station in which a preform for a container is molded with the parting line of the preform is located on an exterior side surface of the finish.
Figure 8:
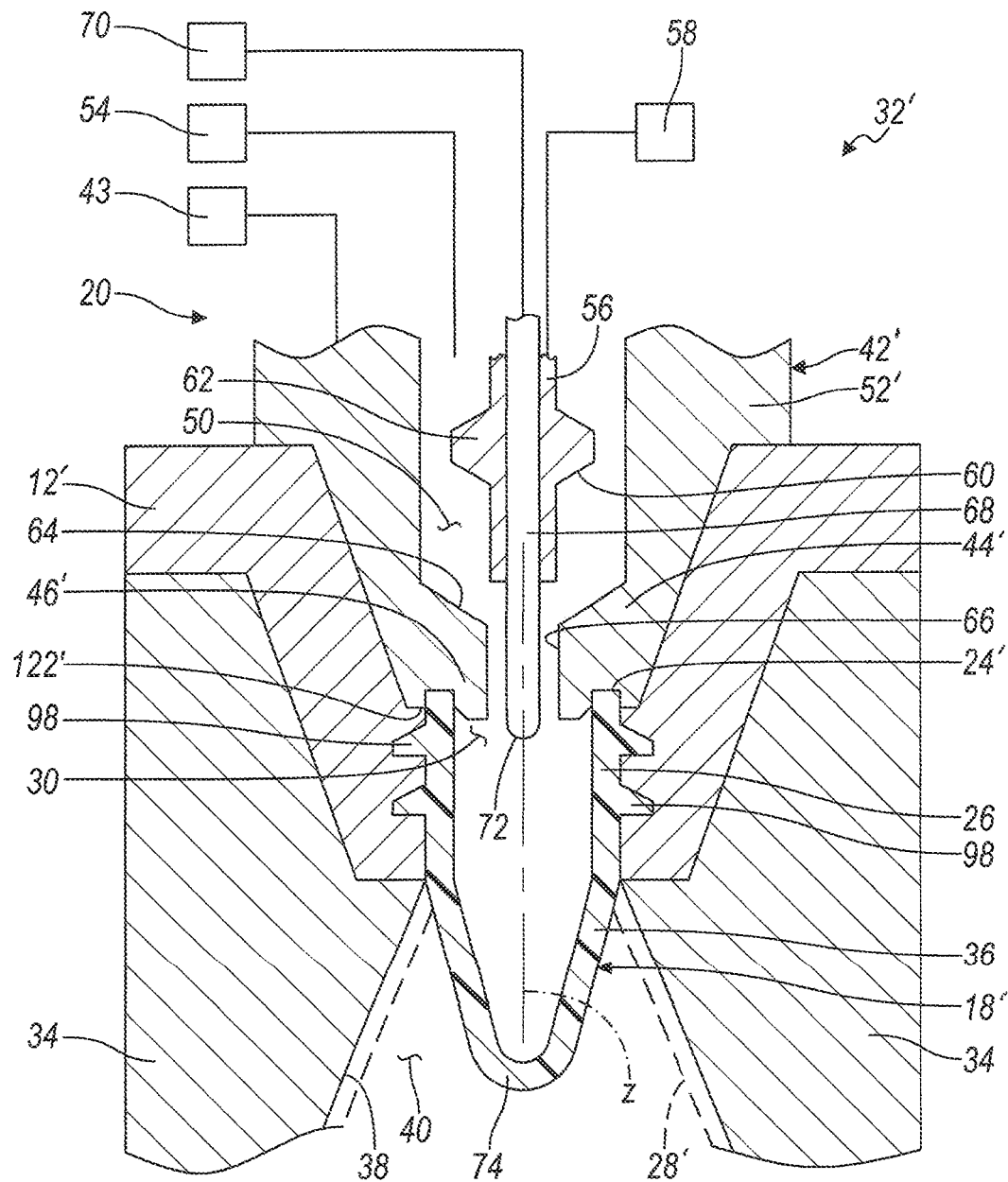
FIG. 8 is a cross-sectional view illustrating a portion of a container forming station in which the preform molded in FIG. 7 is formed into a container by injecting a liquid blow medium into the preform.
Figure 9:
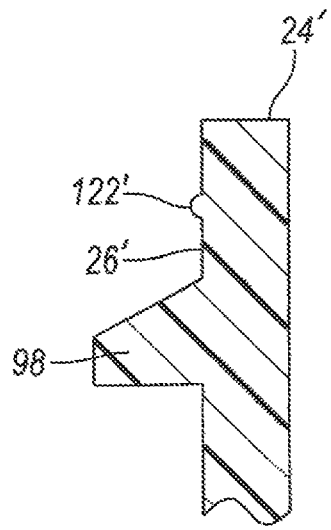
FIG. 9 is an enlarged view of part of the finish of the container formed in FIG. 8 and shows the parting line being located on the exterior side surface of the finish.
Figure 10:
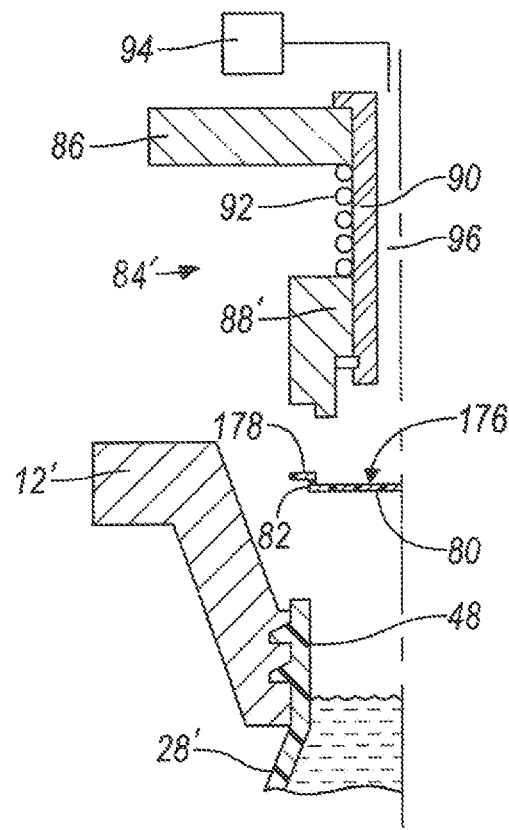
FIG. 10 is a schematic illustration of a mechanism for placing an alternative liner seal in engagement with a formed and filled container prior to ejection of the container from the mold.
Figure 12:
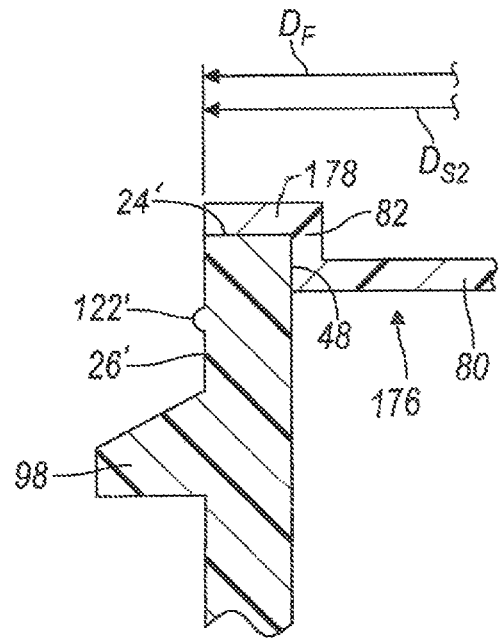
FIG. 12 is an enlarged partial view of the finish of the filled container and shows the alternative liner seal mounted to the finish.
Figure 11:
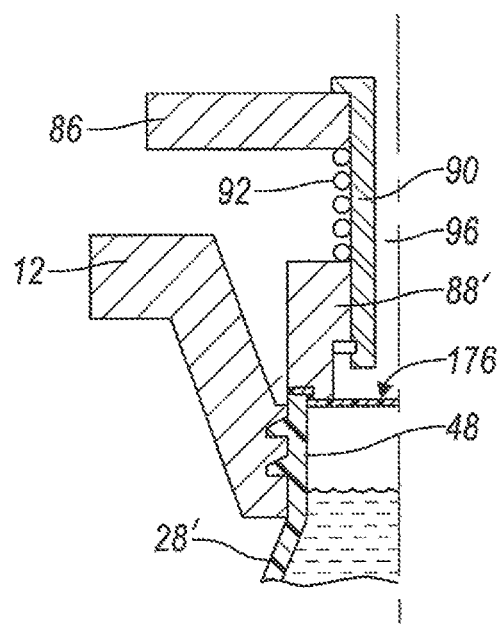
FIG. 11 is a schematic illustration of a mechanism for placing an alternative liner seal in engagement with a formed and filled container prior to ejection of the container from the mold.

As seen in FIGS. 7 and 8, in one respect, the second embodiment differs from the first embodiment in that the thread splits 12' and the preform core 14' engage with one another so as to define a parting line 122 that is not located in the area of the preform cavity 19' that defines the TTS 24'. Rather, the thread splits 12' and the preform core 14' engage one another so that the parting line 122 is located in an area that defines a radial exterior surface of the preform 18. Thus, a portion of the preform core 14' completely defines the TSS 24' and the open end of the preform 18. The parting line 122 is seen in FIG. 7 as being located between the portions defining the top sealing surface 24' and the uppermost portion of the threads 98 of the preform 18.

The container forming station 32' seen in FIG. 8 is likewise similar to the container forming station 32 seen in FIG. 2. The distinction between the structures of forming station 32' seen in FIG. 8 is that the lower end of the nozzle bell 44' is shaped to mate with the thread splits 12' in FIG. 2 on the exterior side of the finish 26'. The lower end of the nozzle bell 44' thus extends over the TSS 24' of the preform 18'. Otherwise, the container forming station 32' operates and functions in the same fashion as described above in connection with FIG. 7, which is herein referred to.

In accordance with the principles of the second embodiment of the invention, an inner liner/seal 176 is also engaged with the finish 26' to seal the mouth 30' of the filled container 28' prior to the removal of the container 28' from the forming station 32'. In this embodiment, however, the inner liner/seal 176 has a radial flange 178 defining an outer diameter $D_{s2}$ that is the same or about the same as the outer diameter $D_f$ of the finish 26' or TSS 24' of the container 28'. More specifically, the diameter $D_{s2}$ is dimensioned so that the radial flange 178 terminates at or adjacent to the outer circumference or perimeter of the TSS 24'. In this configuration, the radial flange 178 is sealingly engaged across the entire TSS 24'.

The remainder of the inner liner/seal 176 of the second embodiment is constructed in the same manner as the prior embodiment. Similarly, the mechanism for mounting the inner liner seal 176 to the finish 26' of the filled container 28' is constructed and operates as previously discussed above, the distinction merely being that the plug 88' is shaped at its lower end to correspond with the shape of the inner liner seal 176. Reference is therefore made to the discussion provided above in connection with FIGS. 10 and 11.

As a person skilled in the art will readily appreciate, the above description is meant as an illustration of implementation of the principles of this invention. This description is not intended to limit the scope or application of this invention since the invention is susceptible to modification, variation and change, without departing from the spirit of this invention, as defined by the following claims.

The invention claimed is:

1. A hydraulic blow molding apparatus for forming a container from a preform, the hydraulic blow molding apparatus comprising:
   a container forming station having a forming head coupled to a source of liquid end product used as a liquid blow medium, the container forming station further including a mold configured to receive a preform and having interior surfaces defining a container shape, the container forming station being configured to inject the liquid end product into the preform and expand the preform into contact with the interior surfaces of the mold to simultaneously form and fill a container with the liquid end product, the container being located within the container forming station and being full of the liquid end product, the hydraulic blow molding apparatus further including a fluid tight seal configured to be engaged with the container while the container is within the container forming station, and wherein the seal includes an axially extending ring, the axially extending ring being configured for fluid tight engagement with an axially extending inner surface of the container whereby the seal is retained on the container, and the fluid tight engagement being one of a press-fit or frictional engagement.

2. The hydraulic blow molding apparatus according to claim 1, wherein a radially extending portion of the seal extends one of completely or partially across a top sealing surface of the container.

3. The hydraulic blow molding apparatus according to claim 1, wherein the seal includes a radially extending disc closing a mouth defined by a finish of the container.

4. The hydraulic blow molding apparatus according to claim 1, wherein the seal includes a radial flange extending completely across the top sealing surface of a finish of the container.

5. The hydraulic blow molding apparatus according to claim 1, wherein the seal defines a diameter that is substantially equal to an outer diameter of a finish of the container.

6. The hydraulic blow molding apparatus according to claim 1, wherein the container includes a parting line located on an exterior surface of a finish of the container.

7. The hydraulic blow molding apparatus according to claim 1, wherein the seal includes a radial flange extending less than completely across a top sealing surface of a finish of the container.

8. The hydraulic blow molding apparatus according to claim 1, wherein the seal defines a diameter that is less than an outer diameter of a finish of the container.

9. The hydraulic blow molding apparatus according to claim 8, wherein the container includes a parting line located on a top sealing surface of the container, the parting line having a diameter that is greater than the diameter of the seal.

10. The hydraulic blow molding apparatus according to claim 1, further comprising a sealing mechanism configured to apply the seal to a finish of the container prior to removal of the container from the forming station, the sealing mechanism including a plug that is movable in a direction towards the finish of the container, the plug having an end configured to receive and retain the seal.

11. The hydraulic blow molding apparatus according to claim 10 wherein the plug is coupled to an air source configured to apply a vacuum retaining the seal in engagement with the plug.

12. The hydraulic blow molding apparatus according to claim 11, wherein the air source is configured to provide pressurized air causing the seal to be released from the plug.

13. The hydraulic blow molding apparatus according to claim 10, wherein the plug is biased in the direction of the container.

14. The hydraulic blow molding apparatus according to claim 1, wherein the hydraulic blow molding apparatus is a one-step hydraulic blow molding apparatus.

15. The hydraulic blow molding apparatus according to claim 1, wherein the seal is configured for use with a cap attached and engaged with a finish of the container.

* * * * *